Dec. 18, 1945.   L. J. EYLER   2,391,012
BOMB RELEASE
Filed Jan. 21, 1937   8 Sheets-Sheet 1

INVENTOR
LAWRENCE J. EYLER
BY
ATTORNEYS

Dec. 18, 1945.  L. J. EYLER  2,391,012
BOMB RELEASE
Filed Jan. 21, 1937  8 Sheets-Sheet 2

INVENTOR
LAWRENCE J. EYLER
BY John J. Hogan
and Clyde Koontz
ATTORNEYS

Dec. 18, 1945.  L. J. EYLER  2,391,012
BOMB RELEASE
Filed Jan. 21, 1937  8 Sheets-Sheet 3
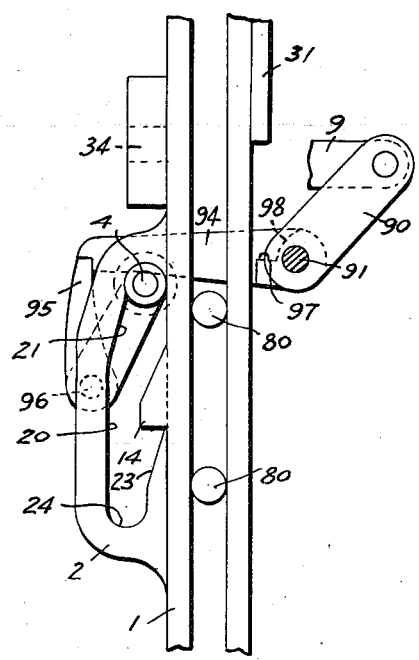
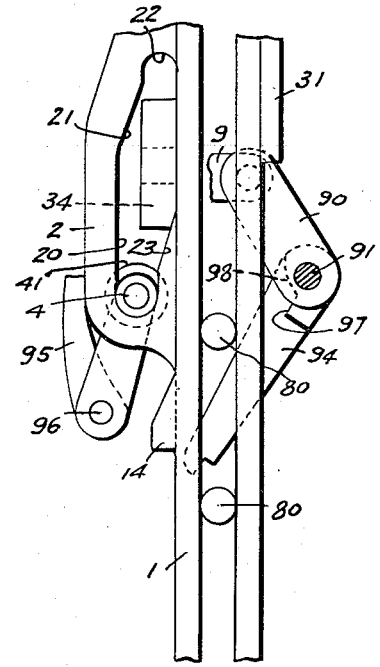
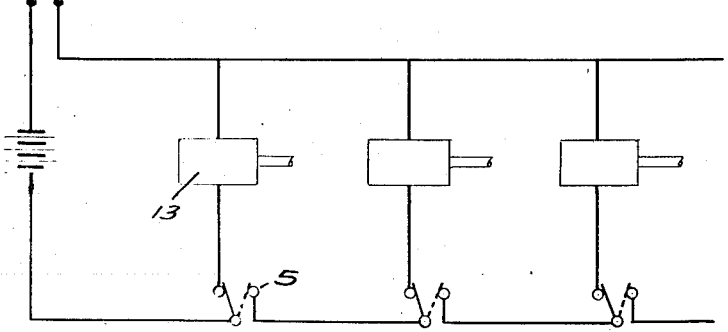
INVENTOR
LAWRENCE J. EYLER

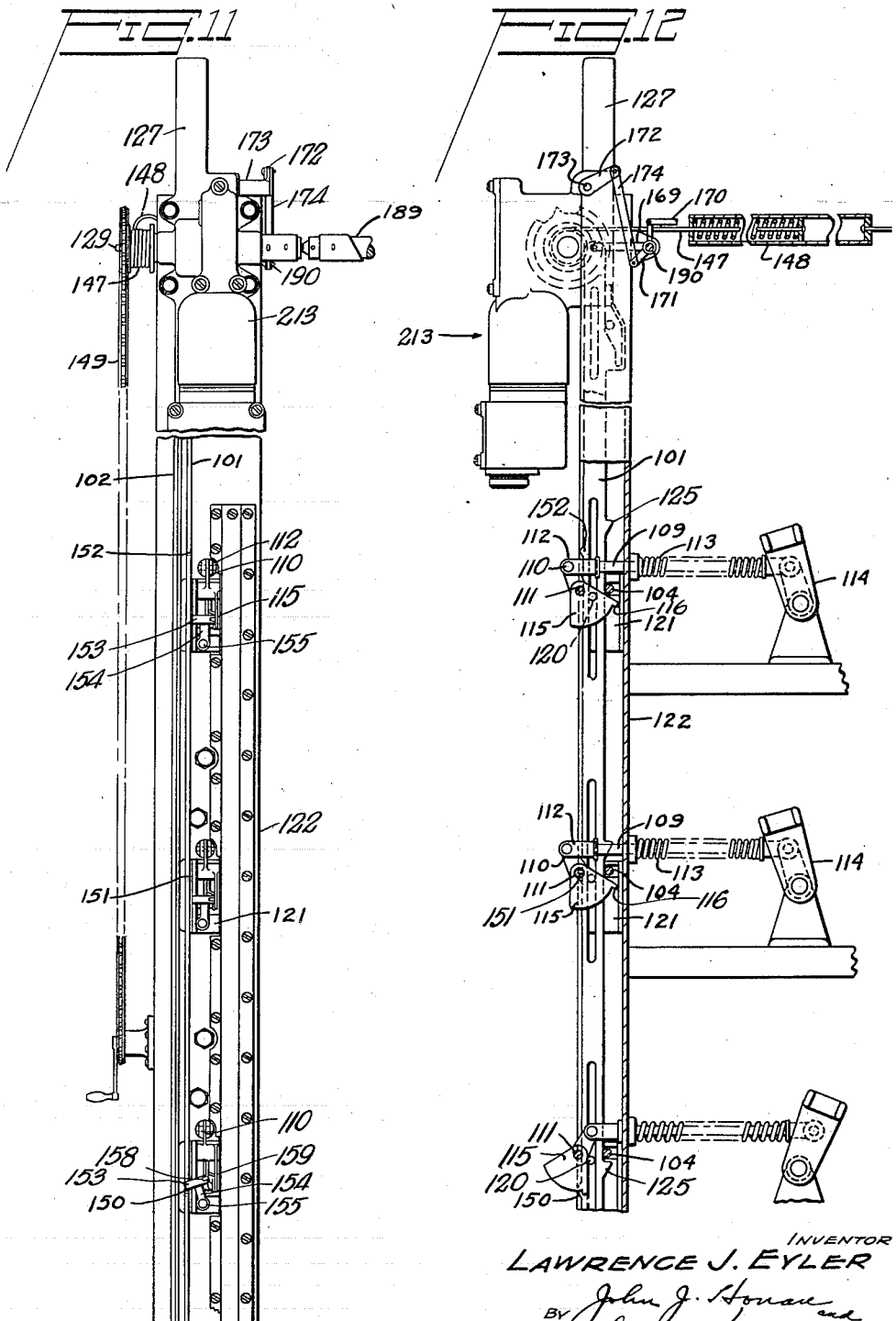

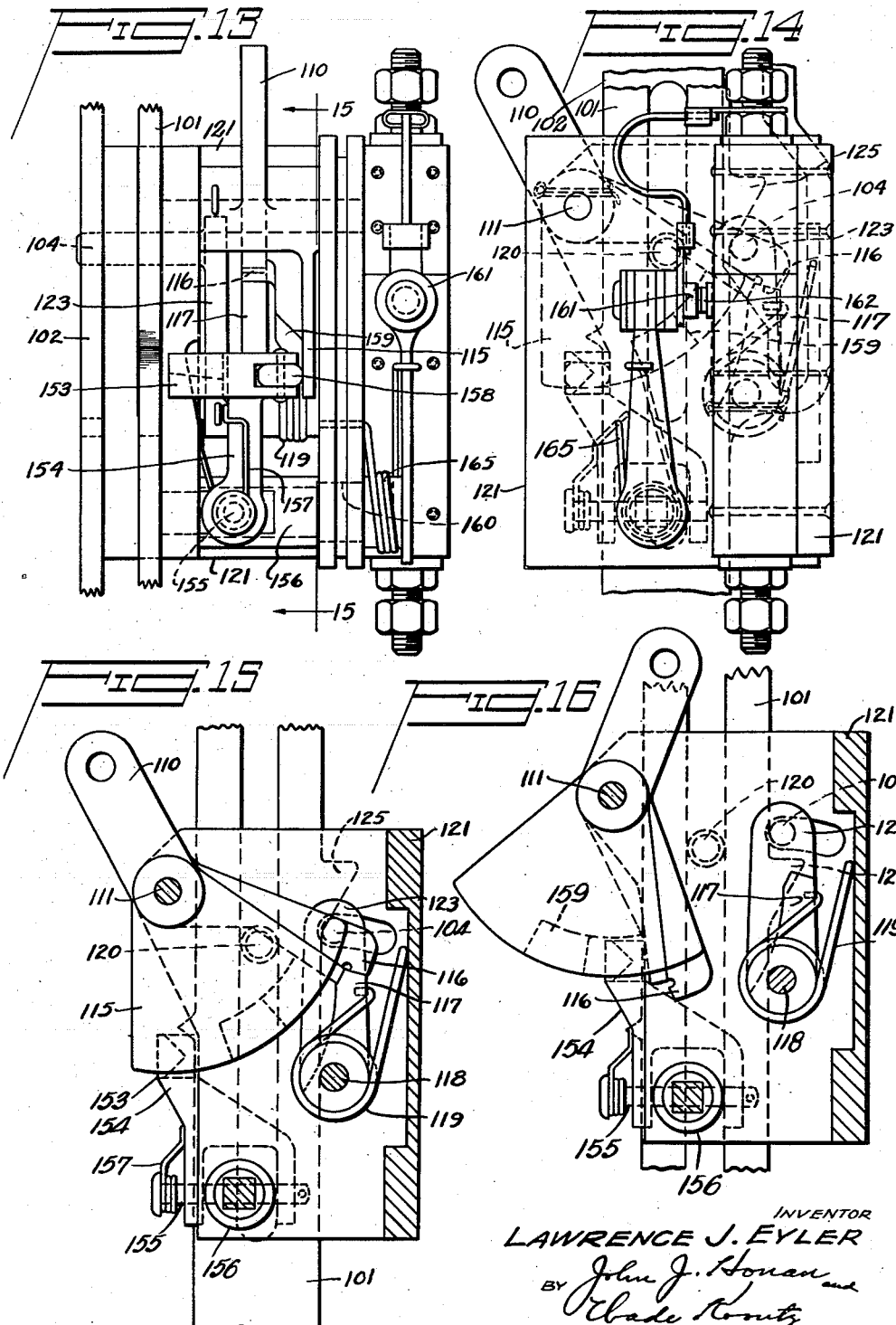

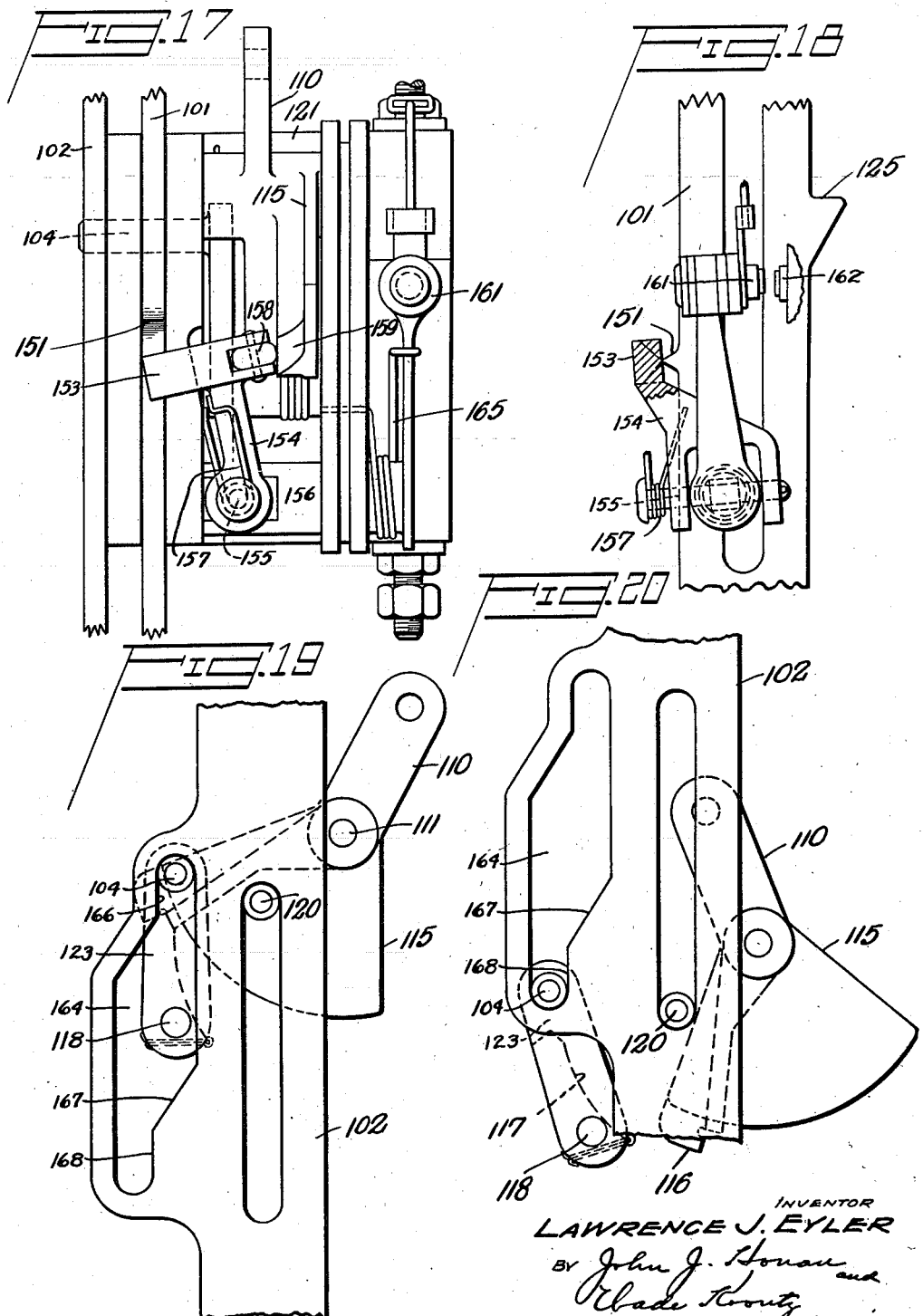

Dec. 18, 1945. L. J. EYLER 2,391,012
BOMB RELEASE
Filed Jan. 21, 1937 8 Sheets-Sheet 7.
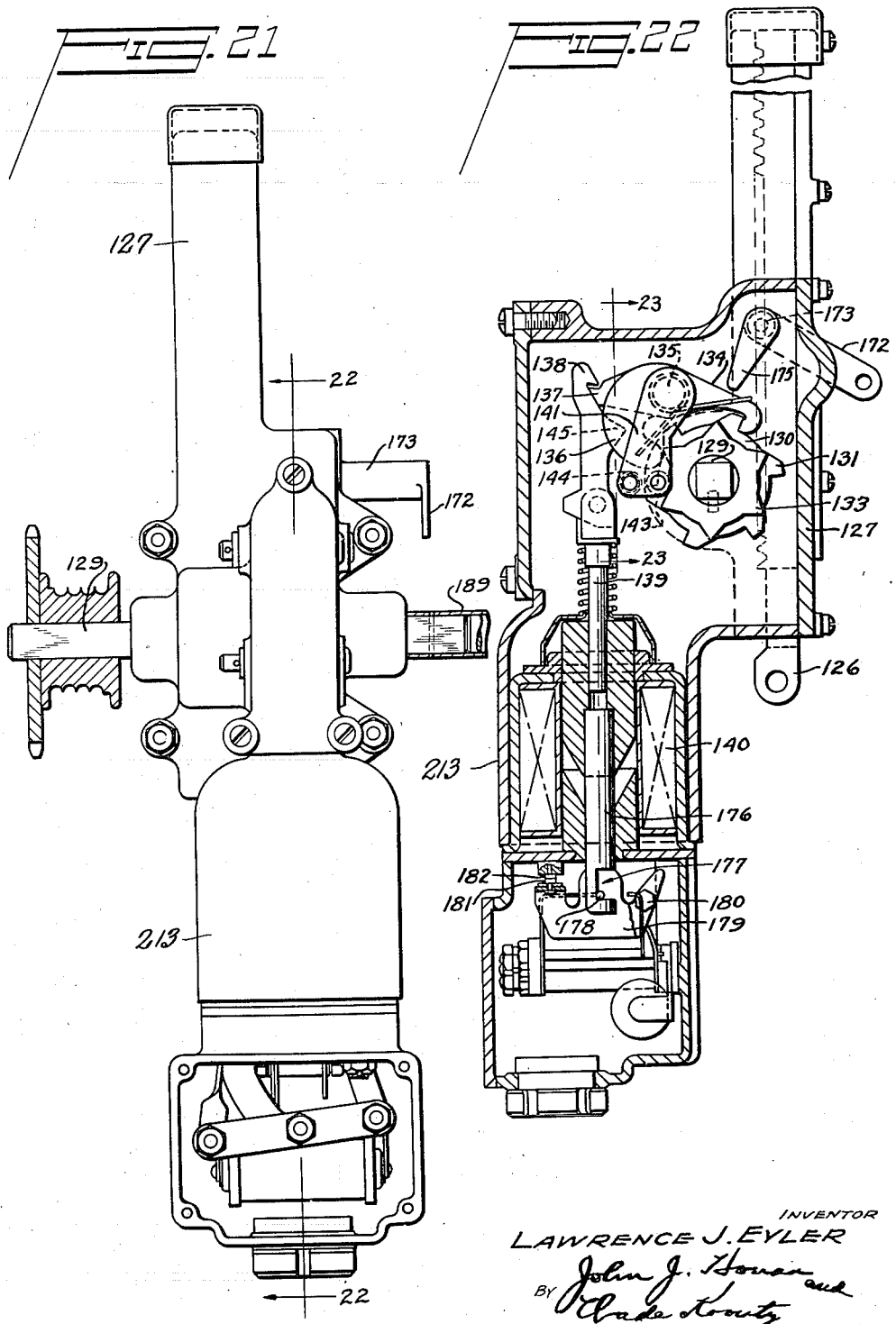
INVENTOR
LAWRENCE J. EYLER
BY
ATTORNEYS Dec. 18, 1945.  L. J. EYLER  2,391,012
BOMB RELEASE
Filed Jan. 21, 1937    8 Sheets-Sheet 8
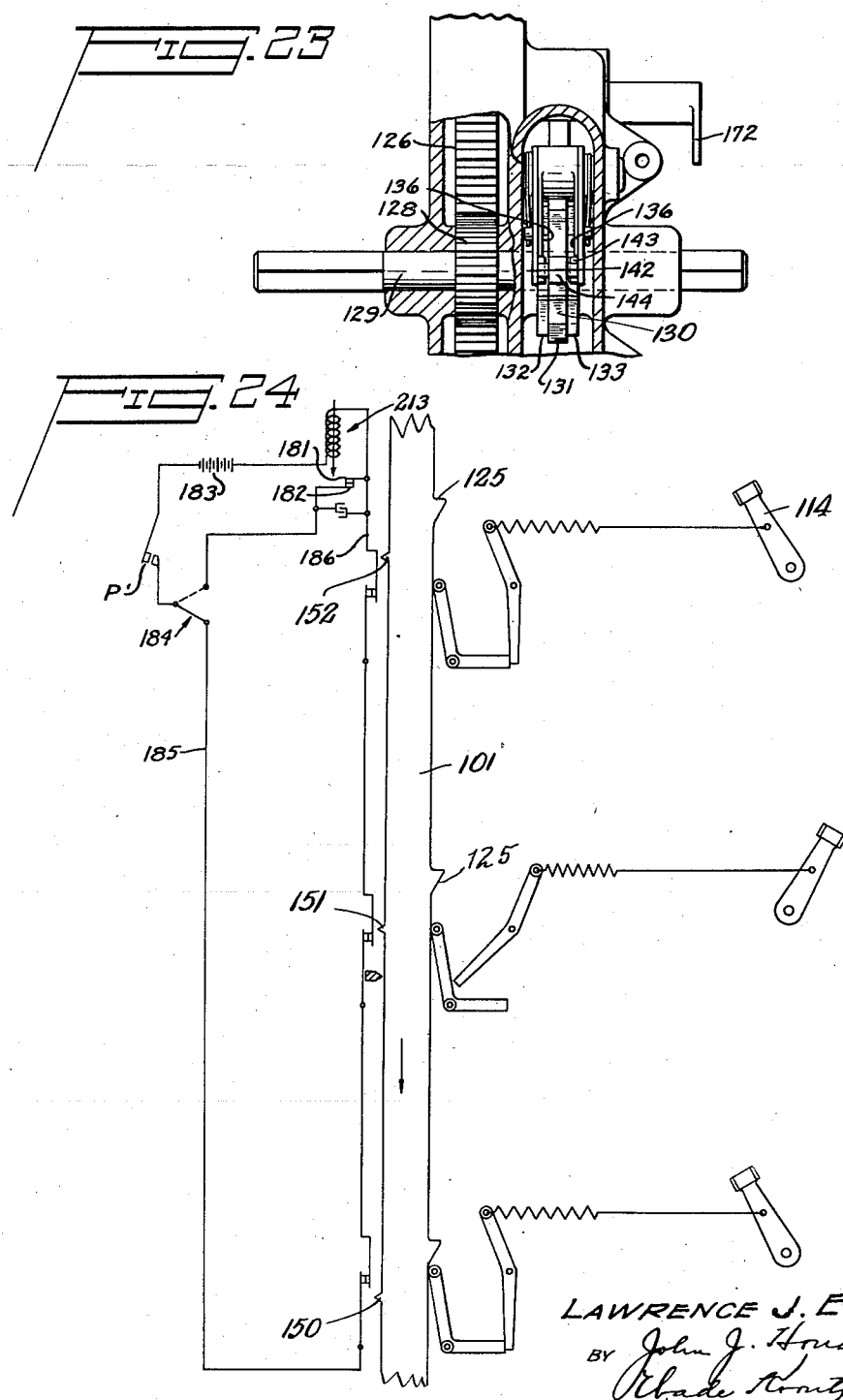
INVENTOR
LAWRENCE J. EYLER
BY John J. Horan
Rhade Koontz
ATTORNEYS Patented Dec. 18, 1945

2,391,012

UNITED STATES PATENT OFFICE 2,391,012

BOMB RELEASE

Lawrence J. Eyler, Dayton, Ohio, assignor to the United States of America, as represented by the Secretary of War Application January 21, 1937, Serial No. 121,578

15 Claims. (Cl. 89—1.5)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to the release of bombs from aircraft, and is a continuation in part of my co-pending application Serial No. 31,424 filed in the United States Patent Office July 15, 1935, wherein I have described novel means for enabling successive release of bombs supported on vertical racks, whether or not such bombs are supported from successive stations on such racks or on companion racks, or at will to enable substantial simultaneous release, that is, release in salvo, of all such bombs.

It is an object of the present invention to provide such bomb releasing means which will safely and positively select and condition the proper bomb station to be released, the next in the intended order of release, and which will operate to prevent the release of any other bomb or bombs, except in the event that it is desired to salvo and drop all bombs, as might be required in the event a bombing airplane is about to make a forced landing without having discharged its bombs.

It is a further object to provide such a device which is adaptable to the successive release of bombs of varying sizes from any given rack, or from alternate racks, so that if the size of the bombs, or the relative size of different bombs, is such that certain stations of the rack are unoccupied and not cocked the device will automatically select and condition each cocked station in succession, skipping the uncocked station to the end that the bomber need only press an actuating button and each time such button is pressed the next bomb in order will be released, whether or not that bomb is supported on a station next to the previously released station, or is supported from a station spaced (of course, by an unoccupied station) from the previously released station. Thus the bomb rack stations may be loaded in any sequence desired or rendered necessary, due to the relative size of different bombs, and still the bomber may drop the next bomb in order each time he pushes the solenoid button at the bomb sight. This is made possible without any permanent rearrangement of any of the parts of this mechanism; in other words, regardless of the loading of large or small bombs, mixed or otherwise, each time the bomber presses the solenoid button he releases the next bomb on the rack or companion rack. Thus is fulfilled one of the objects of this invention, to make the selection of the next bomb to be released automatic. Each time the solenoid button at the bomb sight is pushed to close the switch in the solenoid circuit the next bomb is released.

A further object of this invention is to provide mechanism such that the selector bar shall pass through all empty bomb rack stations, and stop at the station of the next bomb on the rack or companion rack to be released, thus making the selection of loaded and cocked stations automatic.

A further object of the invention is to provide mechanism such that the selecting bar shall be automatically and electrically advanced through all empty bomb rack stations by a single operation of the solenoid control button, to condition and release the next bomb on the rack or companion rack, thus accomplishing the skipping of the unoccupied stations electrically.

It is a further object to provide safety locking means in such a bomb release which will prevent recocking of stations which have not been cocked until all parts are in proper position for such cocking thereby preventing accidental dropping of a bomb during the operation of securing another bomb in place.

It is a further object to provide in such a bomb release, means for locking all the stations against release thus preventing accidental dropping of bombs under any circumstances until this safety device has been moved to the unlocked position.

It is a further object of the present invention to provide in such a bomb release means for locking all the stations against release and for simultaneously locking the solenoid operating mechanism thus preventing accidental tripping of the release mechanism at any station of the rack while bombs are being loaded thereon.

A further object is to enable the ground personnel to cock all bomb shackles and bomb stations, and to lock them with the salvo locking so that any succession of large or small bombs may be loaded into the racks or companion racks in the locked position, making it possible, once the bomb stations are cocked, to load and make the plane ready for a bombing mission without releasing the salvo lock mechanism.

It is a further object, in conjunction with a plurality of racks which are to be discharged in succession, to provide means which is automatically operable, following release of the last bomb from any given rack, to energize the next rack or the operating means therefor so that this second rack can be discharged merely by further operation of a common operating means such as a push button, without putting any burden of selection or transfer upon the bomber.

It is a further object of the invention to provide in such bomb release, means which is adaptable for releasing a train of bombs one at a time or at regular intervals, or consecutively and in quick succession. Thus the bomber need only press the actuating button but once and as long as the button is depressed any desired number of bombs may be released singly and in rapid succession.

Generally speaking it is an object of this invention to improve, simplify and make more safe and certain the operation of such bomb releases, and further objects particularly such as pertain to mechanical details and arrangements as will be understood as this specification proceeds.

My invention comprises the novel parts and the novel combinations and relative arrangement thereof, as shown in the accompanying drawings, described in this specification, and more particularly pointed out by the claims appended thereto.

Figure 8 is an elevation through a single station, illustrating particularly the tripping and combined salvoing and locking mechanism, showing parts in the locked position.

Figure 9 is a similar elevation showing parts in the salvoed position.

Figure 10 is an electrical diagram illustrating the hook-up between the several racks, where a plurality are employed to be operated in succession.

Figure 11 is an elevation of a modified form of release mechanism including three stations.

Figure 12 is a longitudinal section partly in elevation taken through the mechanism illustrated in Figure 11.

Figure 13 is a front elevation of the tripper assembly, one of which is provided at each station of the release mechanism illustrated in Figure 11.

Figure 14 is a side elevation of the tripper assembly illustrated in Figure 13.

Figure 15 is a section taken on the line 15—15 of Fig. 13.

Figure 16 is a view similar to Fig. 15, with the elements in different operating positions.

Figures 17 and 18 are elevations through a given station of the release mechanism illustrated in Figure 11 showing the relation of the parts in the event of such station being uncocked, in order to skip such uncocked station.

Figure 19 is an elevation through a single station of the release mechanism shown in Figure 11, illustrating particularly the tripping and combined salvoing and locking mechanism, showing the parts in the locked position.

Figure 20 is a similar illustration showing the parts in the salvoed position.

Figure 21 is a front elevation of the solenoid gear operating mechanism.

Figure 22 is a sectional view taken on the line 22—22 of Figure 21.

Figure 23 is a sectional view taken on the line 23—23 of Figure 22.

Figure 24 is an electrical diagram of the control system used in the release mechanism illustrated in Figure 11.

Figure 1:
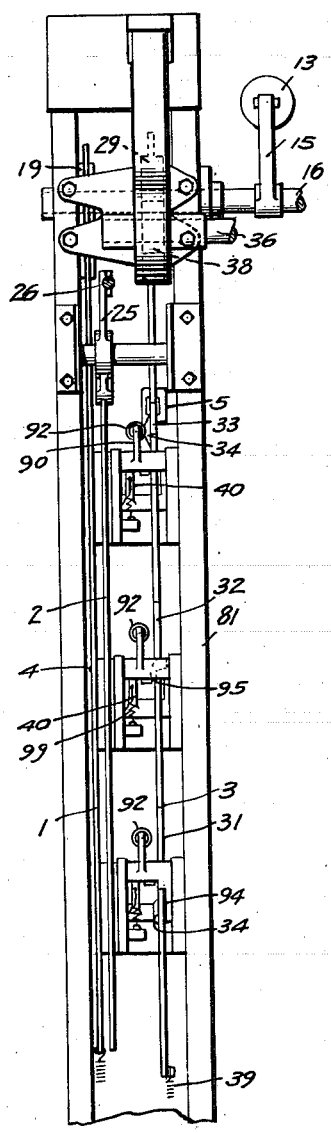
Figure 1 is an elevation of the release mechanism including three stations.

Essentially the invention comprises a release device at each station forming the operative connection between such stations and the bomb shackle (not shown), suitable means at each station for maintaining or holding this release device in cocked position and capable of being tripped to effect release of the bomb, and three devices controlling the operation of the holding device, these three devices being common to and preferably extending through all stations.

These three devices may be designated, one, a solenoid bar 1, because it is conveniently operable by energization of a solenoid 13 through the pressing of a push button P, and which solenoid bar serves as the actuating or tripping means; another, a salvo bar 2 which is preferably manually operated, and which when actuated will engage and release all the retaining means to release them and their associated release link 9, and which may in another position serve as a safety lock for all the stations; and the third, a station selector bar 3 which moves with relation to all the stations, and comes into operative relationship with the several cocked stations in succession to condition them, as by displacing a tripping device or slide pin 4 into the path of the solenoid bar 1, so that upon movement of the solenoid bar this tripping device or slide pin 4 is engaged and this particular selected station is released; the selector bar 3 thereafter moving to the next cocked station to condition the latter for release upon further actuation of the solenoid bar 1.

The station selector bar 3 is so controlled that if an intermediate station is not cocked, it will skip this unlocked station and condition the next cocked station thereby avoiding the necessity of consciously advancing the station selector bar through a dead or uncocked station and insuring that each pressure upon the controlling button P will result in the release of the next bomb.

Figure 2:
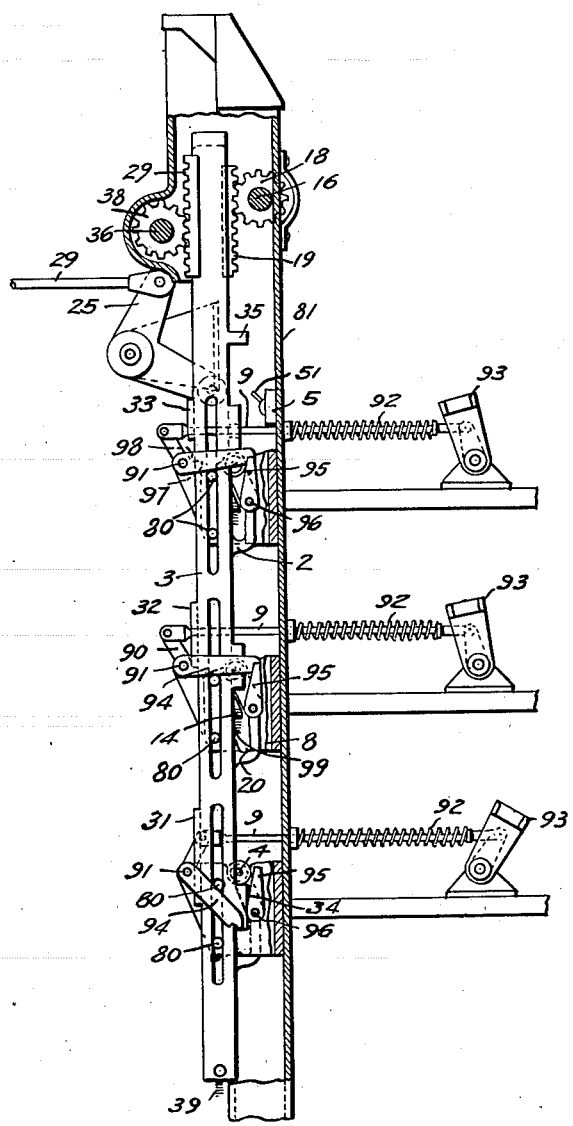
Figure 2 is a longitudinal section, partly in elevation, taken through the release mechanism shown in Figure 1.
Figure 3:
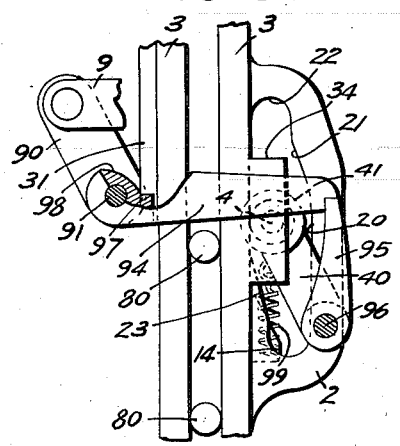
Figures 3, 4 and 5 are elevations through a given station, showing successive stages in the operation of releasing a bomb from such station.

Before proceeding to a detailed description of the several bars and the pin 4 it may be noted that the setting or cocking mechanism at each station, the details of which are largely immaterial, may conveniently comprise an arm 90 pivoted at 91 and connected to the release link 9, which latter is acted upon by a spring 92 tending to throw the arm and link to the right, as seen in Figure 2; the link being connected to an arm 93 which releases the bomb from the shackle (not shown). Likewise pivoted at 91 to move with the arm 90 is an arm 94 provided with a stop shoulder at its end engageable by a spring-held latch 95 pivoted at 96. To cock the station the arm 94 is pressed inward in opposition to the spring 92 until it is engaged by the latch 95; this resulting in compressing the spring 92, but so long as the latch 95 is in engagement with the arm 94 the bomb cannot be released. A spring 99, acting upon an arm 40 which swings with the latch 95, holds the latch in engagement with the arm 94, and urges the latch in the direction so as to engage the latter. The arm 94 is provided with a stop shoulder 97, as shown in Figs. 2 and 3 for a purpose which will appear hereinafter. In conjunction with this is a cut-away portion 98 surrounding its pivot at 91, shown in Fig. 3.

The pivots 91 and 96 and guide pins 80, which guide the several bars referred to through the medium of slots in the bars, are conveniently supported upon suitable framework, generally indicated by the numeral 8, at each station, these being in turn supported within a channel 81 extending between several stations.

Figure 6:
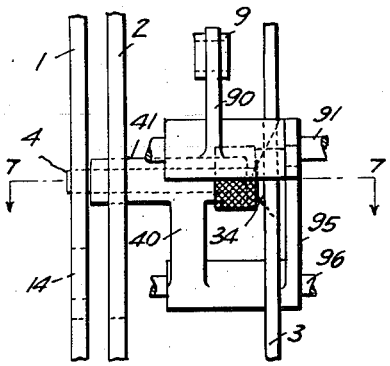
Figure 6 is an elevation of parts in the position shown in Figure 3.
Figure 7:
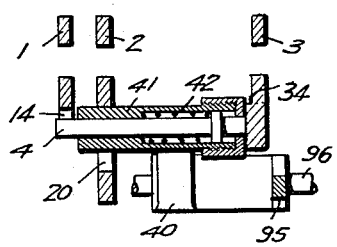
Figure 7 is a transverse section on the line 7—7 of Figure 6.

Referring to Figs. 2 and 3, it will be seen on the pivot 96 to swing with the latch 95 is a tripping arm 40, previously referred to, which carries a transverse cylindrical head 41 at its swinging end. Swinging of this arm, and consequently of the latch 95, is limited by engagement of the head 41 within an aperture 20 of the salvo bar 2, as will appear herein-after. Within the head 41 is received the slide pin 4, previously referred to, this being acted upon by a spring 42 tending to move the pin 4 to the right, as seen in Figures 6 and 7. In the position described its right hand end is in the path of a sear or cam 34 on the station selector bar 3, and its left hand end is out of the path of the sear 14, on the solenoid bar 1. So long as the station selector sear 34 has not engaged and moved the slide pin 4 to the left in opposition to the spring 42, the pin cannot be engaged by the sear 14 on the solenoid bar, so that the solenoid bar may be reciprocated without effecting release of a bomb from this station, but when the station selector bar 3 has been moved to bring its sear 34 for some selected station into engagement with the pin 4 of that station, this pin, being moved to the left, is now projected into the path of the solenoid sear 14, which position is illustrated in Figures 6 and 7, and this particular station is now conditioned ready for release, and at the next reciprocation of the solenoid bar the sear 14 will engage and depress the now projecting end of the pin 4, thus releasing the latch 95 from the arm 94 and permitting the link 9 to move to the right, as seen in Figure 2, releasing the bomb associated with this link. The lower-most bomb in Figure 2 has been shown thus released and the intermediate station is now conditioned and ready for release of its bomb, while the upper-most station is not yet conditioned.

Figure 4:
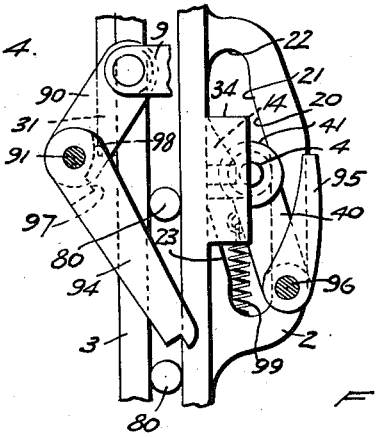
Figure 5:
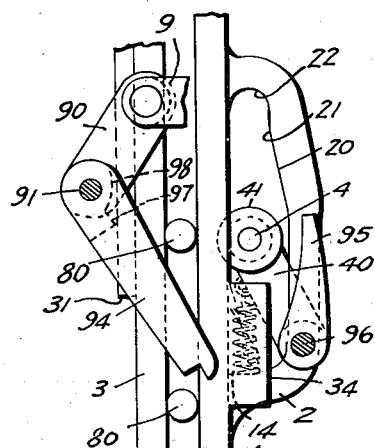

This selection of the station is accomplished by the station selector bar 3. This bar is provided with a plurality of sears 31, 32 and 33, one for each station. The end of each of these sears is positioned to engage the shoulder 97 on the arm 94 of its particular station, and by thus engaging the shoulder 97 movement of the station selector bar 3, in response to its spring 39, is stopped, and the station selector sear 34 is brought into position to move the pin 4 of this particular station into the path of the solenoid sear 14. This condition is illustrated in Figures 3, 6 and 7. After tripping or lease of this station, illustrated in Figure 4, the arm 94 flies away from the latch 95, under the influence of spring 92 whereupon the station selector bar 3 is free to move, under the influence of the tension spring 39, and a sear, 31 for example, moves under the cut-away portion 98, previously referred to, as illustrated in Figure 5 and now this station cannot be recocked until the station selector bar has been moved back to its initial position. However, the next sear, 32 for example, has come into engagement with the shoulder 97 of the next station above, provided that station was cocked. If it was not cocked, the sear 32 passes by this station, and the station selector bar 3 does not stop until the next sear 3 has come into engagement with the shoulder 97 of the next station in the rack, which we can assume is cocked. Thus the station selector bar automatically passes through any uncocked station and conditions the next cocked station.

The salvo bar 2 is provided with a slot at 20 which embraces the head 41 carrying the slide pin 4. This slot is provided with a cam surface 21 leading to a notch 22, which when it engages the head 4, holds the latter against any movement which would release the bomb, and thus the solenoid sear 14, if operated, cannot depress the pin 4 of an armed station, and consequently all the parts are locked and held safely against release of any bomb. This position of the parts is illustrated in Figure 8. If, however, the salvo bar 2 is moved to an intermediate position, as shown in Figures 3, 4 and 5, the parts are unlocked and ready for release of a bomb.

If it is desired to drop all bombs simultaneously the salvo bar is moved upward, and a cam surface 23 leading to a notch 24 depresses the head 41 in the same manner that it is depressed by engagement of the sear 14 with the pin 4, except that the engagement is now between the cam 23 and the head 41, and this depresses and trips all the stations substantially simultaneously, and all bombs are consequently released at once. This position of the parts is shown in Figure 9. Preferably the several cams 23 are so spaced that lower stations are released slightly in advance of the next station above, so that a stripping action, or successive release occurs. The mechanism for operating the salvo bar is preferably manual, and is shown as a bell crank lever 25 operable by a link 26 shown in Fig. 2 extending to the bomber's station.

It is frequently desirable to connect two such racks for alternate operation, for the stations may be so spaced as to receive the smallest size of bomb, and when larger bombs are employed it may be necessary to use alternate stations, and to stagger the relationship of the occupied and cocked stations in the two connected racks, so that a bomb may be released first from one rack, then the next bomb from another rack, then a bomb from the first rack, and so on. In order to connect the racks for such operation, rack teeth 29 are provided on each station selector bar 3, engageable by a pinion 38 on a shaft 36 (see Figs. 1 and 2), whereby movement of one station selector bar is communicated to the companion station selector bar in the other rack, and a stoppage of either one effects the stoppage of the other. Similarly, rack teeth 19 are provided on each of the solenoid bars 1, with which is engageable a pinion 18 on a shaft 16, this shaft extending to the companion pinion and solenoid bar in the companion release mechanism. On this shaft 16 may be secured an arm 15 suitably connected to the solenoid 13, whereby energization of the solenoid will rotate the shaft 16 to effect release of a bomb. All the salvo bars may be connected by means such as the link 26 to a common point where all can be operated manually together.

For a condition where two or more racks are to be operated in succession (as distinguished from alternately) by a common push button P, there is provided a cut-over switch 5, the handle 51 of which projects in the path of an abutment 35 on the station selector bar 3, as shown in Figs. 2 and 10. When the station selector bar has released the last station in its rack the abutment 35 strikes the arm 51, throwing the switch 5 to an opposite position, and as may be seen in Figure 10, when this occurs the particular solenoid controlling this release mechanism is thrown out of the circuit, and the next solenoid for the next release mechanism in order is thrown into the circuit so that by repeated pressure upon the push button P in the hands of the bomber all stations of the first rack are released in succession and then all stations of the next and succeeding racks are released in succession, automatically and without any thought on the part of the bomber.

A modified form of the invention is illustrated in Figures 11 to 24 inclusive. Essentially this modification of my invention is substantially the same in its general scope as the invention set forth herein-above in connection with Figures 1 to 10 inclusive in that it comprises a release device at each station forming the operative connection between such stations and the bomb shackle (not shown), suitable means at each station for maintaining or holding this release device in cocked position and capable of being tripped to effect release of the bomb. It may be distinguished from the foregoing embodiment of my invention, however, in that it comprises only two devices controlling the operation of the holding device, these two devices being common to and preferably extending through all stations.

These two devices may be designated; one, a salvo bar 102 which is preferably manually operated and which when actuated will engage all the retaining means to release them and their associate release links 109, and which may in another position serve as a safety lock for all stations; and the second a tripping bar 101 operable by energization of a solenoid mechanism 213 through the pressing of a push button P', said tripping bar not only serving as the actuating or tripping means but also serving as a station selecting or station skipping means in that it moves with relation to all the stations and comes into operative relationship with the several cocked stations in succession to condition and release them, as by engaging the pin 104 of a tripping device to cause this particular selected station to be released, the tripping bar simultaneously moving into operative relationship with respect to the next cocked station to condition the latter for release. The tripping bar is so controlled that if an intermediate station is not cocked it will be automatically advanced through a dead or uncocked station when the control button P' is depressed and condition and release the next cocked station, thus insuring that each pressure upon the control button P' will result in the release of another bomb.

The setting or cocking mechanism, one of which is provided at each station of the rack, generally comprises an arm 110 freely pivoted at 111 and connected to the release link 112, which latter is acted upon by a spring 113 tending to throw the arm and link to the right as indicated in Figure 12, the link being connected to an arm 114 which releases the bomb from the shackle (not shown). Likewise pivoted at 111 and integral with the arm 110 to move with the latter, as shown in Fig. 15, is a second arm 115 provided with a stop shoulder 116 at its outer end engageable by a spring tensioned latch 117 pivoted at 118.

To cock the station the arm 115 is pressed inward, in opposition to the spring 113, until it is engaged by the latch 117, this resulting in compressing the spring 113, but so long as the latch 117 is in engagement with the arm 115 the bomb cannot be released. A torsion spring 119 surrounding the pivot of the latch 117 holds the latter in engagement with the arm 115 and urges the latch in the direction so as to engage the said arm.

The pivots 111 and 118 and guide pins 120, which latter guide the salvo and tripping bars through the medium of slots in the said bars, are conveniently supported upon suitable brackets, generally indicated by the numeral 121, at each station, these brackets being supported within a channel 122 extending between the several stations.

Carried on the pivots 118 to swing with the latch 117 is a lever arm 123 upon the swinging end of which is transversely arranged the pin 104, heretofore mentioned. Swinging of this arm and consequently of the latch 117, is limited by engagement of the pin 104 within an aperture 164 of the salvo bar 102.

In the cocked position of the tripping mechanism hereinabove described, the intermediate portion of the pin 104 is projected in the path of a trip sear 125 on the tripping bar 101. Thus when the tripping bar has moved in relation to some selected station to position the trip sear 125 adjacent the pin 104, as illustrated in Figure 15, this particular station is now conditioned for release and at the next movement of the tripping bar the sear 125 will engage its pin 104 and depress the lever arm 123, thus releasing the latch 117 from the arm 115 and permitting the link 112 to move to the right as seen in Figure 12, releasing the bomb associated with this link. The relation of the several stations of the rack in this modification of my invention is similar to that shown in Figure 2 of the drawings. That is to say, the lower-most bomb in Figure 12 is shown as having been released and the intermediate station is now conditioned and ready for release of its bomb, while the upper-most station is not yet in condition for release.

The movement of the tripping bar 101 past the several stations of the rack is controlled by energization of the solenoid mechanism 213 heretofore mentioned. As shown in Figures 21, 22 and 23, the upper end of the tripping bar is operatively connected to a gear rack 126 that is slidable longitudinally in a housing 127 conveniently supported upon the upper channelling of the rack. The teeth of this gear rack mesh with a pinion 128 which is keyed to a rotatable cross shaft 129. Keyed upon this same shaft, for rotation with the pinion 128, is a ratchet wheel 130 formed with a central series of ratchet teeth 131 and sets of camming teeth 132 and 133 respectively which are disposed on opposite sides of the ratchet teeth 131. The teeth of the ratchet wheel 130 are adapted for being engaged by the hook end of a spring tensioned pawl piece 134 pivoted at 135. Carried on the pivot 135 to swing with the pawl piece 134 are a pair of arms 136 provided at their swinging ends with camming surfaces adapted for respectively engaging the camming teeth 132 and 133. The opposite or free end of the pawl piece 134 is provided with a shouldered arm 137 adapted for being engaged by a latch 138. This latch is pivotally secured for swinging movement upon the outer end of a spring tensioned plunger shaft 139 which is slidable in a solenoid 140.

Likewise pivoted at 135 to swing independently of the pawl piece 134 is a release member 141. This member comprises slide plates 142 carrying rollers 143 which ride upon the camming teeth 132 and 133, heretofore mentioned.

The outer or swinging end of the release member 141 carries a stud 144, which latter is adapted for engaging a sear 145 projecting from the lower end of the latch 138.

The outer end of the cross shaft 129 has fixedly secured thereto a driving drum upon which is wound a cable 147, as shown in Fig. 11. The one end of this cable is secured against rotation on the drum while the opposite end of the cable is operatively connected to the free end of a tension spring 148, the latter being secured in any convenient manner on the framework of the rack.

The cable 147 is rotatable by means of a sprocket and endless chain arrangement generally indicated by numeral 149.

The operation of the solenoid gear mechanism is as follows: Each time that the push button P' is depressed to energize the solenoid 140, the plunger shaft 139 moves vertically downward and at the same time the latch 138, moves to the left as seen in Figure 22, whereupon the pawl piece 134 is lifted clear of the ratchet teeth 131. At this time, the ratchet wheel 130, under the influence of the spring 148 will be rotated in a clock-wise direction to move the tripping bar past the several stations of the rack. As the plunger shaft 139 is moved down by energization of the solenoid, the rollers 143 of the release member 141 are engaged by the camming teeth 132 and 133 to lift the swinging end of the release member into operative engagement with the sear 145 and raise the engaging end of the latch 138 free of the pawl piece 134 so that the hook end of the latter being then free to move to the left as seen in Figure 22, may engage the next tooth of the ratchet wheel 130 and prevent further rotation thereof.

Thus, each time that the solenoid is energized a step by step advance of the tripping bar past the several stations of the rack is obtained to move the several tripping sears of the tripping bar into operative relationship with each cocked station in succession to trip and release the same.

The selection of the stations is accomplished by the tripping bar 101. This bar is provided with a plurality of station selector sears 150, 151 and 152, one for each station, each sear being positioned adjacent to and in advance of a companion trip sear 125 as illustrated in Figure 12. The outer end of each sear is positioned to engage the camming finger 153 of an arm 154 of its particular station, said arm being pivotally mounted at 155 upon a lever 156 to enable the said camming finger to swing laterally of the tripping bar 101 and into the path of its companion selector sear. The arm 154 is acted upon by a spring 157 tending to move the same to the right as seen in Figure 17. The inner end of the camming finger 153 is provided with a roller 158 which engages a camming portion 159 formed on and movable with the arm 115, heretofore mentioned. Swinging of the arm 115, and consequently of the camming portion 159 will cause the arm 154 to pivot left or right, as will appear hereinafter, and swing the camming finger 153 into or out of the path of its particular station selector sear.

The lever 156, which is pivoted at 160 in the bracket 121, is provided at its swinging end with a contact 161 adapted for engaging a complemental contact 162 conveniently supported upon and insulated from the bracket of this particular station, said lever being acted upon by a spring 165 tending to normally maintain the contacts 161 and 162 in contactual relationship.

From the foregoing description it may be understood that so long as the particular station is cocked, the relation of the parts will be as indicated in Figure 13. That is to say, the roller 158 has not been engaged by the camming portion 159 to move the arm 154 to the left in opposition to its spring 157. Consequently, the camming finger 153 is out of the path of its particular station selector sear 150 and cannot be engaged by the latter upon movement of the tripping bar downwardly to effect a breaking of the contacts 161 and 162. Since, however, the trip pin 104 heretofore mentioned is projected in the path of the trip sear 125, which position is illustrated in Figure 14, when the tripping bar 101 is advanced one step by energization of the solenoid 140 through operation of the push button P', the trip sear 125 will engage and depress the projecting end of the pin 104, thus releasing the latch 117 from the arm 115 and permitting the link 109 to move to the right, as seen in Figure 12, and releasing the bomb associated with this link.

The lower-most bomb in Figure 12 has been shown thus released and the relationship of the parts at the intermediate station is such that should this particular station be cocked, such station would be conditioned and ready for release of its bomb, while the upper-most station is not yet conditioned.

If, however, the intermediate station is dead or unoccupied by a bomb, the relation of the parts will be as indicated in Figures 16 and 17. That is to say, the roller 158 has now been engaged by the camming portion 159 to move the arm 154 to the left, thus swinging the finger 153 laterally and into the path of its companion station selector sear, 151 for example, where it may be engaged by the latter. Inasmuch as the finger 153 is now projected in the path of its station selector sear 151, when the tripping bar 101 is advanced by depressing the controlling button P' to cause energization of the solenoid, the station selector sear 151 will engage the finger 153 and swing the lever 156 about its pivot, causing the contactors 161 and 162 at this particular station to momentarily break. The momentary separation of the contactors will operate to deenergize and then quickly reenergize the solenoid and advance the tripping bar 101 a second step even tho the controlling button P' has been depressed but once and move said bar into operative relationship with the next or succeeding cocked station so that the trip sear 125 of this particular cocked station will engage and depress the projecting end of the trip pin 104 of this particular station, thus releasing the latch 117 from its companion arm 115 and permitting the link 109 of that station to be moved to the right releasing the bomb associated with this link.

Thus it will be seen that the tripping bar, through the medium of the several station selector sears provided thereon, is so controlled in its movements that if an intermediate station is dead or unoccupied, the said tripping bar will be caused to skip this uncocked station and condition and release the next cocked station, thereby avoiding the necessity of consciously depressing the controlling button P' to advance the said tripping bar through the dead or uncocked station and insuring that each pressure upon the controlling button will result in the release of another bomb.

As shown in Figures 19 and 20 the salvo bar 192 heretofore mentioned is provided with a slot 164 which embraces the pin 104 carried upon the arm 123. This slot is provided with a cam surface leading to a notch 166, which when it engages the pin 104 holds the latter against any movement which would release the bomb, and thus the solenoid mechanism if operated, cannot depress the pin 104 of an armed station, and consequently all parts are locked and held safely against the release of any bomb. This position of the parts is illustrated in Figure 19. If, however, the salvo bar 102 is moved to an intermediate position, as shown in Figure 14, the parts are unlocked and ready for selective release of a bomb.

If it is desired to drop all bombs simultaneously, or in salvo, the salvo bar is moved upward, and a cam surface 167, leading to a notch 168, depresses the pin 104 in the same manner that it is depressed by engagement of the trip sear 125, except that the engagement is now between the cam surface 167 and the outer end of the pin 104, and this depresses and trips all the stations substantially simultaneously, and all the bombs positioned at the several stations are released at once. This position of the parts is illustrated in Figure 20. As mentioned hereinabove in connection with the embodiment of my invention illustrated in Figures 8 and 9, the several cam surfaces 167 are so spaced that lower stations are released slightly in advance of the next station above so that a stripping action, or successive release, occurs. The mechanism for operating the salvo bar is preferably manual, and is shown as a bell crank lever 169 operable by a link 170 extending to the bomber's station.

To further insure against the release of any bombs from the several stations when the salvo bar is in the locked position, I provide a second arm 171 which is fixed to and movable with the bell crank lever 169 heretofore mentioned. This arm is connected to a locking arm 172 pivoted at 173 by a connecting link 174. Carried on the pivot 173 to swing with the locking arm 172 is a lever 175 which is swingable into the path of movement of the hook end of the pawl piece 134 heretofore mentioned. Thus, as long as the salvo bar 102 is in its locked position, and should the solenoid be accidentally or otherwise energized, pivotable movement of the hook end of the pawl piece 134 is restrained to prevent its disengagement from the ratchet wheel 130. The solenoid mechanism hereinabove mentioned is also provided with means whereby a train of bombs may be released one at a time or at regular intervals or consecutively and in rapid succession.

As shown in Figure 22 the rearward end of the plunger shaft 139 is formed with a rod extension 176 the latter being provided adjacent its free end with a U-shaped cavity 177 in which is engaged a pin 178 carried by a bracket 179, said bracket being pivotally mounted in the solenoid housing as indicated at 180. The swinging end of the bracket 179 is provided with a breaker contact 181 adapted for engaging a complemental contact 182 carried in the solenoid housing.

The operation of the train release mechanism is as follows:

Each time that the push button P' is depressed, the solenoid upon being energized, will pull the plunger 139 and latch 138 downwardly as previously described.

The distance between the side walls of the cavity 177 is such that during the initial downward movement of the plunger 139 and latch 138, only a sliding engagement occurs between the cavity 177 and the pin 178. As the extension 176 approaches the end of its downward travel, the inner wall of the U-shaped cavity will engage the pin 178, thereby effecting a swinging movement of the bracket 179 to the left to separate the contacts 181 and 182. When this occurs the solenoid will be deenergized and the plunger shaft 139 under the action of its return spring will be moved to its initial position, and move the extension 176 to its initial position as seen in Figure 22. At this time the outer wall of the cavity 177 will reengage the pin 178 and move the bracket 179 to the right. Consequently the contacts 181 and 182 will again move into respective engagement with one another to complete the circuit through the solenoid.

From the foregoing it will be apparent that as long as the push button P' is depressed and maintained in such depressed position, a rapid energization and deenergization of the solenoid takes place so that the bombs at each station may be released one at a time at regular intervals and in rapid succession.

In Figure 24 I have illustrated the electrical control system for operating the bomb rack. It will be noted that the energy for actuating the solenoid is supplied by a battery 183, the one terminal of which is electrically connected to the push button P', hereinabove mentioned. The push button P' is connected in series with a reversing switch 184, in the one position of which the current from the battery 183 is directed thru a main lead wire 185 to the lowermost set of contacts 161 and 162 provided at each station of the rack. As shown in Figure 24 the several sets of such contacts are in series relationship with respect to one another and are connected to the solenoid by a return wire 186, which latter is in turn connected to the opposite terminal of the battery.

Thus it will be seen that as long as the reversing switch is in the position illustrated in full line in Figure 24, current will be supplied to the solenoid through the several sets of contacts provided at each station of the rack to enable selective release of the bombs at each cocked station. If it is desired to effect a train release of the bomb at the several stations of the rack the reversing switch 184 is moved to the dotted position illustrated in Figure 24. In so doing the solenoid circuit is completed through the contacts 181 and 182 hereinbefore mentioned rather than through the several sets of contacts provided at each station of the rack.

It is frequently desirable to connect two bomb racks for alternate operation, for the stations of the rack may be so spaced as to receive the smallest size of bombs, and when larger bombs are employed it may be necessary to use alternate stations, and to stagger the relationship of the occupied and cocked stations in the two connected racks, so that a bomb may be released first from one rack, then the next bomb from another rack, then a bomb from the first rack, and so on. In order to connect the racks for such operation each tripping bar 101 may be provided with rack teeth, each engageable by a pinion similar to the pinion 128 on the cross shaft 129 hereinabove mentioned, the shaft on each rack being operatively connected together by a torque tube 189, whereby movement of one tripping bar is communicated to the companion tripping bar in the other rack, and the stoppage of either one effects stoppage of the other. Similarly the bell crank lever 169 of the one rack may be operatively connected to a similar bell crank lever (not shown) provided on a companion rack; the two bell crank levers being connected together by means of a second torque tube 190 whereby movement of one salvo bar is communicated to the companion salvo bar in the opposite rack, and the stoppage of either one effects stoppage of the other.

What I claim as my invention is:

1. A multiple station bomb release comprising a release device at each station and actuable into cocked and uncocked positions, means at each station to retain the same in cocked position, each of said means including a slide pin and means supporting and guiding the pin for longitudinal movement and for bodily movement transversely of the pin, actuating means extending through the several stations, means to reciprocate the latter repeatedly through a definite path, a selector device likewise extending through the several stations, means to effect its advance step by step in a definite path in one direction, and permitting its return, the pin of each retaining means, when the latter is in non-cocked position, lying outside of the path of the actuating means, but when moved into cocked position lying in the paths of the actuating means and the selector device, pin sears carried by said selector device and spaced, relative to the spacing between stations, to engage and move axially in succession the pin of each successive cocked station, stop means on the selector device, cooperating stop means associated with each retaining means, and disposed only when the latter is in cocked position, to stop the selector pin sear in position to hold the corresponding pin in its axially moved position, and tripping sears carried by the actuating means and engageable, upon reciprocation of the latter, with any axially moved pin, thereby to trip the corresponding retaining means and the release device.

2. A multiple station bomb release comprising a release device at each station and actuable into cocked and uncocked positions, means at each station to retain the same in cocked position, each of said means including a slide pin and means supporting and guiding the pin for longitudinal movement and for bodily movement transversely of the pin, actuating means extending through the several stations, means to reciprocate the latter repeatedly through a definite path, a selector device likewise extending through the several stations, means to effect its advance step by step in a definite path in one direction, and permitting its return, the pin of each retaining means, when the latter is in non-cocked position, lying outside of the path of the actuating means, but when moved into cocked position lying in the paths of the actuating means and the selector device, pin sears carried by said selector device and spaced, relative to the spacing between stations, to engage and move axially in succession the pin of each successive cocked station, stop means on the selector device, cooperating stop means associated with each retaining means, and disposed only when the latter is in cocked position, to stop the selector pin sear in position to hold the corresponding pin in its axially moved position, tripping sears carried by the actuating means and engageable, upon reciprocation of the latter, with any axially moved pin, thereby to trip the corresponding retaining means and the release device, and station selector sears extending along the selector device, and engageable with each retaining means, after the latter has been tripped, to prevent recocking of the retaining means until the selector device is returned to its initial position.

3. A multiple station bomb release comprising a release device at each station and actuable into cocked and uncocked positions, means at each station to retain the same in cocked position, each of said means including a slide pin and means supporting and guiding the pin for longitudinal movement and for bodily movement transversely of the pin, actuating means extending through the several stations, means to reciprocate the latter repeatedly through a definite path, a selector device likewise extending through the several stations, means to effect its advance step by step in a definite path in one direction, and permitting its return, the pin of each retaining means, when the latter is in non-cocked position, lying outside of the path of the actuating means, but when moved into cocked position lying in the paths of the actuating means and the selector device, pin sears carried by said selector device and spaced, relative to the spacing between stations, to engage and move axially in succession the pin of each successive cocked station, stop means on the selector device, cooperating stop means associated with each retaining means, and disposed only when the latter is in cocked position, to stop the selector pin sear in position to hold the corresponding pin in its axially moved position, tripping sears carried by the actuating means and engageable, upon reciprocation of the latter, with any axially moved pin, thereby to trip the corresponding retaining means and the release device, and means engageable with all the pin supporting and guiding means, and movable to lock all such means in cocked position.

4. A multiple station bomb release comprising a spring-loaded release device at each station and actuable into cocked and uncocked positions, a frame including the several stations, an arm pivotally supported on said frame at each station, and operatively connected to the release device whereby the two move together, a sear pivoted in the frame and engageable with said arm to hold the release device in cocked position, a trip arm movable with said sear, a spring-held slide pin slidable, transversely of the frame, in the swinging end of the trip arm, an actuating bar guided in the frame for repeated longitudinal reciprocation, and extending through the several stations, a selector bar likewise extending through the several stations and guided in the frame for longitudinal movement, a spring tending to advance said selector bar in one direction, a plurality of pin sears, one for each station, carried by said selector bar, and spaced and positioned to singly engage and move axially each slide pin in succession, and in opposition to its spring, stop means on the selector bar, cooperating stop means on said first-mentioned arm, engageable when in cocked position with the selector bar stop means, to stop the selector bar pin sear in engagement with the corresponding slide pin, thereby to hold the latter in axially displaced position, a plurality of tripping sears carried by the actuating bar, and engageable upon reciprocation of the latter with any axially displaced slide pin, thereby to trip the corresponding pivoted sear, the first-mentioned arm, and the release device.

5. In combination with two or more multiple station bomb racks intended for successive release of bombs, a bomb release device at each station of each rack actuable into cocked and uncocked positions, means at each station to retain the same in cocked positions, means in each rack and movable into operative relationship to each cocked station of the rack in succession to condition such station for release, actuating means in each rack and operable upon any such conditioned station to trip and release the same, motor means to actuate each actuating means, a common operating means for the several motor means, a movable control member on each rack and operative in a primary position to connect the motor means of the associated rack with said operating means and operative in a secondary position to disconnect the motor means from the operating means and to connect the latter with the control member of a companion rack, and means in each rack operable for moving the rack control member from its primary to its secondary position, said means being operatively connected with the actuating means of the rack to be operated thereby automatically upon release of the last station of the rack.

6. In combination with two or more multiple station bomb racks intended for successive release of bombs, a bomb release device at each station of each rack actuable into cocked and uncocked positions, means at each station to retain the same in cocked position, selector means movable into operative relationship to each cocked station in succession to condition such station for release, actuating means operable upon any such conditioned station to trip and release the same, a solenoid to actuate each tripping means, a common circuit and a single switch therein to energize the several solenoids of the several racks, and a cut-over switch engageable by the selector means, following release of the last bomb of a given rack, to deenergize the solenoid of such rack and to energize the solenoid of the next rack to be discharged.

7. A multiple station bomb release comprising a release device at each station and actuable into cocked and uncocked positions, means at each station to retain the same in cocked position, each of said means including a tripping device, actuating means movable to engage a tripping device to release the corresponding station, solenoid means including means for energizing and deenergizing the same to effect step by step advance of said actuating means in a definite path in one direction, selector means at each station, each of said means including a camming finger and means supporting said finger for longitudinal swinging movement and for swinging movement transversely of the finger, the finger of each selector means, when said retaining means is in uncocked position, laying in the path of movement of said actuating means but laying outside the path of movement of said actuating means, when said retaining means is in cocked position, a breaker member swingable with said camming finger, a relatively fixed breaker member associated with said swingable breaker member, and selector sears carried by said actuated means, and spaced relative to the spacing between stations, said sears being engageable, upon movement of said actuating means, with any longitudinally moved finger, to swing transversely, and in succession, the finger of each succeeding uncocked station, to separate said breaker members, whereby said solenoid means is de-energized and re-energized to advance said actuating means through any such uncocked stations.

8. A multiple station bomb release comprising a release link at each station and actuable into cocked and uncocked positions, means at each station and engageable with the release link to retain the same in cocked position, a tripping bar movable past the several stations to successively engage and release the links, solenoid means to actuate said tripping bar, a common circuit and a manually operable control switch therein to energize said solenoid, and selector means at each station, each of said selector means including a breaker mechanism electrically connected in circuit with said solenoid and operable by said tripping bar in the uncocked condition of the station, to interrupt said circuit and cause said tripping bar to be advanced into operative relationship with the next succeeding cocked station, whereby the several cocked stations are releasable in succession by successive operation of said control switch.

9. A multiple station bomb release comprising a release link at each station and actuable into cocked and uncocked positions, means at each station to retain the same in cocked position, a tripping bar movable past the several stations to successively release the links, solenoid means to actuate said tripping bar and effect its advance step by step in a definite path in one direction, a common circuit and a single manually operated control switch therein to energize said solenoid, and selector means at each station, each of said means including a breaker mechanism electrically connected to said solenoid and operable by said tripping bar, at any uncocked station, to interrupt said circuit and cause said tripping bar to be automatically advanced through such uncocked station and into tripping relationship with the next cocked station by a single depression of said control switch.

10. A multiple station bomb release comprising a release link at each station and actuable into cocked and uncocked positions, means at each station to retain the same in cocked position, a tripping bar movable past the several stations to successively release the links, solenoid means to actuate said tripping bar and effect its advance step by step in a definite path in one direction, a common circuit and a single manually operated control switch therein to energize said solenoid, selector means at each station, each of said selector means including a breaker mechanism electrically connected to said solenoid and operable by said tripping bar, at any uncocked station, to interrupt said circuit and cause said tripping bar to be automatically advanced through such uncocked station and into tripping relationship with the next cocked station by a single depression of said control switch, means engageable with the retaining means at all stations and movable at will to lock all stations in cocked position, and means associating with said locking means and operable upon movement of the latter to simultaneously lock said solenoid means against release.

11. A multiple station bomb release comprising a release link at each station and actuable into cocked and uncocked positions, means at each station to retain the same in cocked position including a trip element actuatable to disengage the retaining means from the said link, a tripping bar movable past the several stations and having projections spaced in sequence to engage and actuate the trip elements to successively release the links, solenoid means to actuate said tripping bar and effect its advance step by step in a definite path in one direction, a common circuit and a single manually operated control switch therein to energize said solenoid, selector means at each station, each of said selector means including a breaker mechanism electrically connected to said solenoid and operable by said tripping bar, at any uncocked station, to interrupt said circuit and cause said tripping bar to be automatically advanced through such uncocked station and into tripping relationship with the next cocked station by a single depression of said control switch and manual control means including a bar movable relatively to the several stations and having cam slots embracing the several trip elements and responsive to movement of the bar in one direction to engage and move the trip elements to effect release of the links and responsive to movement of the bar in the opposite direction to engage and hold the trip elements against actuation.

12. A bomb release comprising a release device actuable into cocked and uncocked positions, means to retain the same in cocked position, a tripping device movable past the retaining means, solenoid means for causing movement of said tripping device, a primary control switch to energize said solenoid, and a breaker mechanism associated with said retaining means, said mechanism including a selector finger movable from a normal position out of the path of movement of said tripping device, into such path, to be engaged upon movement of said tripping device and effect instantaneous interruption of the current passing through said solenoid and cause automatic re-energization of said solenoid.

13. A bomb release comprising a release device actuable into cocked and uncocked positions, means to retain the same in cocked position, a tripping device movable past the retaining means, solenoid means for moving said tripping device, primary control means for energizing said solenoid, secondary control means associated with said retaining means, and movable, when said retaining means moves from cocked to tripped position, from a normal position out of the path of movement of the tripping device, into such path, to be engaged thereby and momentarily interrupt the energization of said solenoid by said primary control means.

14. A multiple station bomb rack having a release device at each station movable into cocked and uncocked positions, a tripping device, actuating means connected with the tripping device and operable through a given cycle to move the same reciprocally across the several stations, a latch associated with each release device to retain it in cocked position and having a relatively displaceable trip element, selector means movable in a given direction into and out of contact with the several trip elements singly and in succession and adapted when in contact with a trip element to position the same in the path of the tripping device, self-acting means operating when the selector means is out of contact with a trip element to position the latter out of the path of the tripping device, means operatively connected with and controlled by the release devices to be effective in the cocked position of a release device to stop the movement of the selector means when the latter is in contact with the associated trip element and to be effective in the uncocked position of the release device to allow the selector means to be moved past the said trip element, and means connected with the selector means and self-acting at the completion of each operating cycle of the tripping device actuating means to move the selector means in the given direction and past uncocked release devices and to the next cocked release device.

15. A multiple station bomb rack having a release device at each station movable into cocked and uncocked positions, means at each station for retaining the release device in cocked position and capable of being tripped to free the release device for movement into uncocked position, said retaining means including a trip pin, electro-mechanical means for selectively releasing the stations and including a tripping member, and actuating mechanism operatively connected with the tripping member for moving the latter step by step past the stations and into engagement with the trip pins of the several retaining means in succession to trip the latter, and manual control means including a bar movable relatively to all stations and having cam openings embracing the several trip pins, said openings having surfaces operable in one position of the bar to lock the trip pins against tripping action and in another position of the bar to trip the said pins simultaneously and in an intermediate position of the bar to free the pins for tripping action by operation of the electro-mechanical means.

LAWRENCE J. EYLER.